Patented Aug. 1, 1950

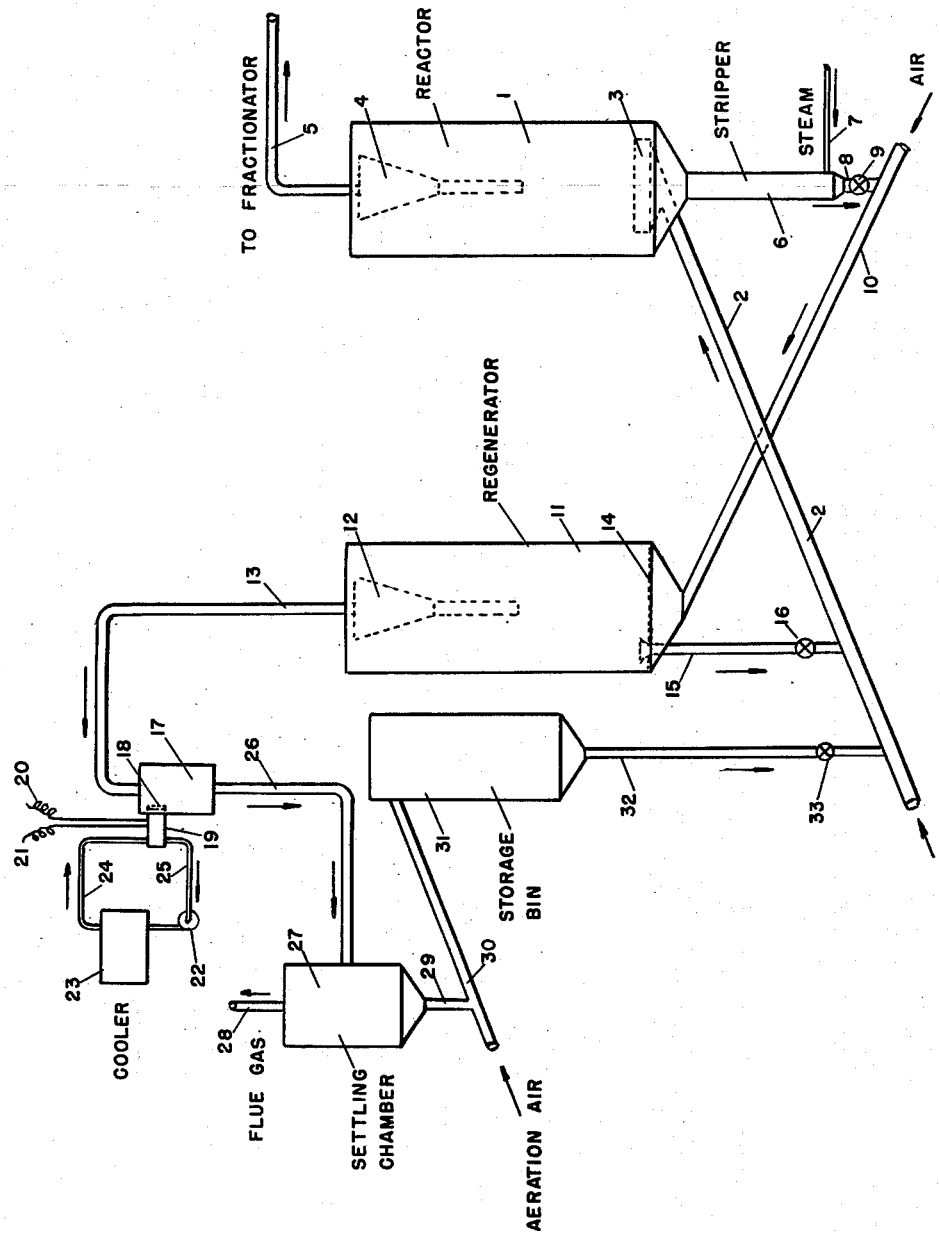

2,517,139

UNITED STATES PATENT OFFICE 2,517,139

PYROLYTIC CONVERSION OF HYDROCARBONS

Reading Barlow Smith, Hammond, Ind., assignor to Sinclair Refining Company, New York, N. Y., a corporation of Maine Application April 29, 1947, Serial No. 744,659

2 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in oil vapors, passed to a reaction zone in which conversion of the oil occurs and in which spent catalyst is separated from the oil vapors, the separated catalyst stripped of oil, regenerated by burning off coke or carbon deposited thereon, and the regenerated catalyst again suspended in the stream of oil vapors passing to the reaction zone. Operations of the type described are commonly designated fluid catalyst processes.

In conventional operation, the spent catalyst normally passes from the bottom of the reactor through a stripping column extending downwardly from the lower end of the reactor and in which the catalyst is contacted with steam for the purpose of removing, or stripping, from the catalyst vaporizable hydrocarbons remaining thereon. The stripped catalyst passes from the bottom of the stripper and is picked up by a stream of air and conveyed thereby into the bottom of the regenerator in which the catalyst, at elevated temperature, is intimately contacted with air, or other oxidizing gases, whereby carbonaceous deposits are burned off and the regenerated catalyst is withdrawn from the regenerating zone and returned to the reactor.

Flue gases, products of the combustion, pass from the top of the regenerator to a stack, or precipitator, for the recovery of catalyst fines from the gases.

The so-called catalyst fines are composed of extremely finely divided particles of the solid catalyst, some of which may be present in the fresh catalyst and others are formed by attrition of the catalyst during its repeated cycling through the system. These catalyst fines present an exceptionally difficult problem of separation from effluent gases but are, nevertheless, valuable as catalysts. The fines are not effectively removed from the effluent gases by conventionally used cyclone separators and, generally, a considerable proportion thereof is carried off with the stack gases.

My present invention provides an improved process adapted to continuous operation and comprising a plurality of cooperating steps so coordinated as to constitute a unitary operation in which a charge of catalyst is repeatedly used and intermittently regenerated and returned to the conversion zone and in which catalyst fines are effectively recovered and returned to the system.

In accordance with my present invention, the effluent gases from the regenerating zone, with the catalyst fines suspended therein, are subjected to ultra-sonic vibrations of the order of about one-half megacycle per second whereby the particles of finely divided catalyst dispersed in the effluent gases are caused to coagulate or agglomerate to such an extent that they are readily separable from the effluent gases, for instance, by settling. The ultra-sonic vibrations may be generated in the known manner by high frequency electrical excitation of a piezoelectric crystal, for instance, a piezoquartz crystal.

These vibrations may, with advantage, be imparted to the gaseous suspension by passing the suspension through a chamber in contact with a diaphragm adapted to be vibrated at the previously noted ultra-sonic frequency, for instance, a diaphragm such as described separating the chamber from an adjacent cooled chamber containing a vibrating crystal submerged in a cooling liquid. From the first said chamber, the gaseous suspension may be passed to an enlarged settling chamber in which agglomerates of the catalyst fines are separated by gravity settling and from which the separated fines are returned to the reaction chamber. Other conventional means for separating the agglomerates from the gases may be employed.

The invention will be further described and illustrated with reference to the accompanying drawing which represents conventionally and somewhat diagrammatically a flow diagram of a fluid catalyst cracking operation embodying my invention.

Referring more particularly to the embodiment of the invention shown in the drawings, the apparatus indicated by the reference numeral I represents a generally cylindrical reactor of conventional type. The finely divided catalyst suspended in oil vapors, enters the reactor through conduit 2 extending into the reactor, and terminating in a conical member 3 of somewhat smaller maximum diameter than the reactor and opening upwardly into the reactor through a conventional grid, not shown.

As the hot vapors pass upwardly through the reactor, there is a tendency for the catalyst to drop out of suspension forming a so-called "dense phase," or "high density," body of catalyst in the reactor from which the catalyst flows downwardly through the annular space between the member 3 and the walls of the reactor.

Oil vapors, products of the conversion, rise to the top of the reactor, pass through a cyclone type separator 4, for the removal of suspended catalyst from the vapors, the latter passing therefrom through conduit 5 to fractionating apparatus, not shown, and the separated catalyst is returned to the dense phase body of catalyst in the reactor.

Spent catalyst is withdrawn from the bottom of the reactor into the upper end of stripper 6 and passes downwardly therethrough in contact with steam or other gaseous stripping medium introduced into the bottom of the stripper through line 7, stripped catalyst passes from the bottom of the stripper through conduit 8, in which there is interposed a valve 9, and flows into conduit 10 where it is picked up by a current of air or other oxidizing gas and carried upwardly into the regenerator 11.

In the regenerator, carbonaceous deposits are burned off from the catalyst by contact with the air, or other oxidizing gas, introduced through conduit 10, the products of combustion passing from the upper portion of the regenerator through cyclone separator 12, for the separation of the larger particles of suspended catalyst, and from which the products of combustion pass through conduit 13, the separated catalyst being returned to the dense phase body of catalyst in the regenerator.

Regenerated catalyst is withdrawn from the bottom of the regenerator from a zone above the grid 14 through regenerated catalyst leg 15, in which there is interposed valve 16, advantageously a conventional slide valve, for the control of the flow of catalyst therethrough into the lower end of conduit 2 where it is picked up by a stream of preheated charge oil passing to the reactor.

Flue gases, passing from the regenerator through conduit 13 and carrying catalyst fines in suspension, are passed through chamber 17 in which they are subjected to ultra-sonic vibration transmitted to the suspension through diaphragm 18 forming a partition between chamber 17 and the continuous chamber 19 in which there is a piezo-crystal adapted to be excited, in the conventional manner, by high frequency electrical impulses transmitted to the crystal through electrical connections 20 and 21.

The crystal is protected from temperature rise due to heat transmitted through the diaphragm by continuously circulating a liquid cooling medium, oil, for instance, through the chamber 19, by means of pump 22, cooler 23 and connections 24 and 25. The cooling liquid also serves as a medium for transmitting the vibrations of the crystal to the diaphragm.

Flue gases, together with agglomerates of catalyst fines, pass from chamber 17 through conduit 26 to enlarged settling chamber 27, from which the flue gases pass through conduit 28 to a stack, not shown, and separated catalyst passes through conduit 29 into elevator conduit 30 wherein it is picked up by a current of aeration air and carried up into storage bin 31 from which it flows, in a fluidized state, through leg 32 into the lower end of conduit 2 where it is picked up by the current of hydrocarbon charge oil and carried into the reactor, together with catalyst from the regenerator. The flow of catalyst through the leg 32 is regulated and controlled by valve 33.

While I have for simplicity shown a single vibrating diaphragm in the chamber 17, it will be understood that a plurality of such diaphragms may be employed. It is generally desirable to impart to the suspension passing through chamber 17 vibratory energy equivalent to about 250 acoustical watts per cubic foot of volume of the chamber.

It will be understood that the utility of the present invention is not restricted to the particular embodiment thereof herein described, but is applicable to various modifications of fluid catalyst processes in which catalyst fines are carried off in suspension in effluent regenerator gases.

The catalyst employed may be of the type conventionally used in fluid catalyst processes, for instance, a silica-alumina type catalyst in finely divided or powdered form. The reaction conditions may likewise be those conventionally used in operations of this type and, as understood by the art, the optimum temperatures and pressures employed will depend primarily upon the type of feed stock used, the particular catalyst employed, and the reaction desired.

In cracking gas oil, for instance, the reaction temperature may, with advantage, be within the range of 800° to 1,000° F. and the pressure at the top of the reactor within the range of about 5 to 25 pounds per square inch. The regeneration temperature may be within the range of 950° to 1,200° F., heat for the reaction being supplied in large measure by the hot catalyst passing into the charge oil from the regenerator.

The invention is not restricted to the particular means shown for generating the ultra-sonic vibrations or imparting the vibrations to the suspensions but contemplates other known means for imparting energy in the form of ultra-sonic vibrations to the respective suspensions. Further, ultra-sonic vibrations varying somewhat from the specific frequency given may be used without departing from the spirit of the invention and may be more or less effective in coagulating catalyst fines of some types.

I claim:

1. In the fluid catalyst process for the conversion of hydrocarbons in which a finely divided catalyst is repeatedly used and intermittently regenerated in a regenerating zone by burning off the carbonaceous material deposited thereon and catalyst fines are carried off in suspension in the combustion gases from the regenerating zone, the step of recovering catalyst fines from the suspension by subjecting the suspension to ultra-sonic vibrations of the order of one-half megacycle per second, whereby the catalyst fines are agglomerated, separating the agglomerates of catalyst fines from the gases and returning the seperated catalyst fines as separated from the suspension to the zone of hydrocarbon conversion.

2. In the fluid catalyst process for the conversion of hydrocarbons in which a finely divided catalyst is repeatedly used and intermittently regenerated in a regenerating zone by burning off the carbonaceous material deposited thereon and catalyst fines are carried off in suspension in the combustion gases from the regenerating zone, the step of recovering catalytic fines from the suspension which comprises passing the suspension through a confined zone and subjecting the suspension therein to ultra-sonic vibration of a frequency of the order of one-half megacycle per second and of an intensity equivalent to 250 acoustical watts per cubic foot, whereby the catalyst fines are agglomerated, separating the agglomerates of catalyst fines from the gases and returning the separated catalyst fines as separated from the suspension to the zone of hydrocarbon conversion.

READING BARLOW SMITH.

REFERENCES CITED

The following references are of record in the file of this patent:

UNITED STATES PATENTS

| Number | Name | Date |
| --- | --- | --- |
| 2,215,484 | St. Clair | Sept. 24, 1940 |
| 2,300,761 | Amy | Nov. 3, 1942 |
| 2,393,554 | Ogorzaly | Jan. 22, 1946 |

OTHER REFERENCES

Bergmann, "Ultrasonics," pp. 212–216, John Wiley and Sons (1938).